(12) United States Patent
Witsch

(10) Patent No.: US 7,462,387 B2
(45) Date of Patent: Dec. 9, 2008

(54) FLUOROPOLYMER RELEASE COATING HAVING IMPROVED HEAT TRANSFER PROPERTIES AND ABRASION RESISTANCE

(75) Inventor: Michael J. Witsch, Norwood, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 152 days.

(21) Appl. No.: 11/435,000

(22) Filed: May 15, 2006

(65) Prior Publication Data

US 2006/0234037 A1   Oct. 19, 2006

Related U.S. Application Data

(63) Continuation-in-part of application No. 11/301,880, filed on Dec. 13, 2005, now abandoned.

(60) Provisional application No. 60/636,681, filed on Dec. 16, 2004.

(51) Int. Cl.
  B32B 15/08 (2006.01)
  B32B 15/18 (2006.01)
  B32B 15/20 (2006.01)
  B32B 27/20 (2006.01)

(52) U.S. Cl. .................. 428/216; 428/331; 428/421; 428/457

(58) Field of Classification Search .......... 428/331, 428/421, 422, 457
  See application file for complete search history.

(56) References Cited

U.S. PATENT DOCUMENTS

| | | |
|---|---|---|
| 4,014,834 A | 3/1977 | Concannon |
| 5,079,073 A | 1/1992 | Tannenbaum |
| 5,250,356 A | 10/1993 | Batzar |
| 5,626,907 A | 5/1997 | Hagiwara et al. |
| 5,670,010 A | 9/1997 | Hagiwara et al. |
| 6,103,361 A | 8/2000 | Batzar et al. |
| 6,114,028 A | 9/2000 | Muchin et al. |
| 6,248,435 B1 | 6/2001 | Leck |
| 6,291,054 B1 | 9/2001 | Thomas et al. |
| 6,592,977 B2 | 7/2003 | Thomas et al. |
| 6,761,964 B2 | 7/2004 | Tannenbaum |

FOREIGN PATENT DOCUMENTS

| | | |
|---|---|---|
| EP | 0 604 522 B1 | 8/1995 |
| EP | 1 452 242 A2 | 9/2004 |
| WO | WO 02/078862 A2 | 10/2002 |

OTHER PUBLICATIONS

Handbook of Chemistry, 77th Edition, 12-187 Referenced From Shackelford, J. F. and Alexander, W., CRC Materials Science and Engineering Handbook, CRC Press, Boca Raton, FL 1991.

*Primary Examiner*—Ramsey Zacharia

(57) ABSTRACT

The invention relates to a structure comprising a substrate and a baked release coating on the substrate, the coating comprising an undercoat and a fluoropolymer overcoat, wherein said undercoat contains magnetizable flakes and a plurality of silicon carbide particles. The coated substrates of the invention have improved heat transfer properties, improved abrasion resistance and good release.

15 Claims, No Drawings

FLUOROPOLYMER RELEASE COATING HAVING IMPROVED HEAT TRANSFER PROPERTIES AND ABRASION RESISTANCE

FIELD OF THE INVENTION

This invention is in the field of a substrate having a reinforced fluoropolymer release coating thereon. In particular, the invention is in the field of cookware having a release coating thereon, where the coating has improved heat transfer properties such that a reduced time is required to reach cooking temperature, while exhibiting improved abrasion resistance.

BACKGROUND OF THE INVENTION

It has long been desirable to produce coated cookware which has an inner cooking surface having good release properties while exhibiting good abrasion resistance. It is also desirable that heat can be rapidly transferred to such cooking surfaces without the need to subject the outer bottom surface of the cooking vessel to excessive heat. Cookware with a release coating that includes a heat conductive pattern that enhances heat transfer to and evenly distributes heat about the cooking surface is disclosed in U.S. Pat. No. 6,114,028 to Muchin et al. The heat conductive pattern in Muchin is arranged such that it extends outwardly from the central region of the inner surface of a cooking vessel toward the outer peripheral region. This facilitates transfer of heat from the central region to the outer region and assists in maintaining the entire cooking surface at a uniform temperature, especially if the cooking vessel is placed on a heating element that has a smaller diameter than the diameter of the vessel's bottom.

However, as discussed in U.S. Pat. No. 6,248,435 to Leck, it is common to expose cookware to heating over the entire flat surface of the cookware. Leck thus provides an improved heat transfer release finish on cookware by coating the cookware interior with a mixture of fluoropolymer and magnetic flakes, such as stainless steel, and magnetically orienting the flakes to run in the thickness direction of the coating.

However, both of the above mentioned patents rely on magnetically orienting flake to achieve enhanced thermal properties of the release coatings disclosed. The requirement to magnetically induce orientation of the flake necessitates special equipment that can hamper the efficient commercial production of the cookware.

Recent inventions recognize the advantage of adding an inorganic filler film hardener component to the undercoat of multilayer nonstick coatings. Leck, U.S. Pat. No. 6,248,435, discloses that this component may be one or more metal silicate compounds such as aluminum silicate and metal oxides, such as titanium dioxide and aluminum oxide. Thomas, U.S. Pat. No. 6,291,054, and Tannenbaum, U.S. Pat. No. 6,761,964 A1 disclose the advantage of reinforcing the undercoat with particles of silicon carbide for superior abrasion resistance. It would be desirable to provide cookware which has even better heat transfer properties than those exhibited by the prior art to allow the cookware to heat up even faster and exhibit good or improved abrasion resistance while maintaining good release characteristics.

SUMMARY OF THE INVENTION

While stainless steel is known to provide increased thermal conductivity, it has been found that magnetizable flake, such as stainless steel flakes in a release coating, acts both as a reinforcing material and effects efficient heat transfer. The flake in conjunction with silicon carbide particles as an inorganic filler film hardener, achieves a synergistic effect, providing both excellent heat transfer properties and superior abrasion resistance. Thus, the structure of the present invention is able to heat up faster than cookware using known release coatings of the prior art while retaining excellent release characteristics. By "heat up faster" is meant that the release coating of this invention can reach a cooking temperature of 400° F. (204° C.) in less time than a similar system that does not contain a combination of magnetizable flake and silicon carbide particles.

Thus, in accordance with the present invention, there is provided a structure comprising a substrate and a baked release coating on the substrate, the coating comprising an undercoat and a fluoropolymer overcoat, wherein said undercoat contains magnetizable flakes and a plurality of silicon carbide particles.

DETAILED DESCRIPTION OF THE PREFERRED EMBODIMENTS

The present invention comprises a structure comprising a substrate and a baked release coating on the substrate. The release coating comprises an undercoat and a fluoropolymer overcoat, wherein the undercoat contains magnetizable flakes and a plurality of silicon carbide particles. The preferred undercoat comprises a primer layer and an intermediate layer positioned between said primer and said overcoat. The undercoat may be any coating under the overcoat, and can comprise a primer layer and/or one or more intermediate layers positioned between the primer layer and the overcoat. The "overcoat" is the top or surface coating which may also comprise one or more additional coatings. The overcoat comprises a fluoropolymer which when baked together with the undercoat provides a non-stick, release surface. The undercoat, including the intermediate layer, also preferably comprises a fluoropolymer.

Fluoropolymer

The fluoropolymer component of the release coating which may be present in the primer layer, the intermediate layer and the overcoat is preferably polytetrafluoroethylene (PTFE) having a melt viscosity of at least $1 \times 10^8$ Pa·s at 380° C. for simplicity in formulating the composition and the fact that PTFE has the highest heat stability among the fluoropolymers. Such PTFE can also contain a small amount of comonomer modifier which improves film-forming capability during baking (fusing), such as perfluoroolefin, notably hexafluoropropylene (HFP) or perfluoro(alkyl vinyl) ether, notably wherein the alkyl group contains 1 to 5 carbon atoms, with perfluoro(propyl vinyl ether) (PPVE) being preferred. The amount of such modifier will be insufficient to confer melt-fabricability to the PTFE, generally being no more than 0.5 mole %. The PTFE, also for simplicity, can have a single melt viscosity, usually at least $1 \times 10^9$ Pa·s, but a mixture of PTFE's having different melt viscosities can be used to form the fluoropolymer component. Use of a single fluoropolymer in the composition, which is the preferred condition, means that the fluoropolymer has a single chemical identity and melt viscosity.

While PTFE is preferred, the fluoropolymer component can also be melt-fabricable fluoropolymer, either combined (blended) with the PTFE, or in place thereof. Examples of such melt-fabricable fluoropolymers include copolymers of TFE and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Preferred comonomers with TFE include the perfluorinated monomers such as perfluoroolefins having 3-6 carbon atoms and perfluoro(alkyl vinyl ethers) (PAVE) wherein the alkyl group contains 1-5 carbon atoms, especially 1-3 carbon atoms. Especially preferred comonomers include hexafluoropropylene (HFP), perfluoro(ethyl vinyl ether) (PEVE), perfluoro(propyl vinyl ether) (PPVE) and perfluoro(methyl vinyl ether) (PMVE). Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The molecular weight of the melt-fabricable tetrafluoroethylene copolymers is unimportant except that it be sufficient to be film-forming and be able to sustain a molded shape so as to have integrity in the primer application. Typically, the melt viscosity will be at least $1 \times 10^2$ Pa·s and may range up to about $60\text{-}100 \times 10^3$ Pa·s as determined at 372° C. according to ASTM D-1238.

The fluoropolymer component is generally commercially available as a dispersion of the polymer in water, which is the preferred form for the composition of the invention for ease of application and environmental acceptability. By "dispersion" is meant that the fluoropolymers particles are stably dispersed in the aqueous medium, so that settling of the particles does not occur within the time when the dispersion will be used; this is achieved by the small size of the fluoropolymer particles, typically on the order of 0.2 micrometers, and the use of surfactant in the aqueous dispersion by the dispersion manufacturer. Such dispersions can be obtained directly by the process known as dispersion polymerization, optionally followed by concentration and/or further addition of surfactant.

Alternatively, the fluoropolymer component may be a fluoropolymer powder such as PTFE micropowder. In which case, typically an organic liquid is used in order to achieve an intimate mixture of fluoropolymer and polymer binder. The organic liquid may be chosen because a binder dissolves in that particular liquid. If the binder is not dissolved within the liquid, then the binder can be finely divided and be dispersed with the fluoropolymer in the liquid. The resultant coating composition can comprise fluoropolymer dispersed in organic liquid and polymer binder, either dispersed in the liquid or dissolved in order to achieve the intimate mixture desired. The characteristics of the organic liquid will depend upon the identity of the polymer binder and whether a solution or dispersion thereof is desired. Examples of such liquids include N-methylpyrrolidone, butyrolactone, high boiling aromatic solvents, alcohols, mixtures thereof, among others. The amount of the organic liquid will depend on the flow characteristics desired for the particular coating operation.

Polymer Binder

The composition of the primer layer preferably contains a heat resistant polymer binder. The binder component is composed of polymer which is film-forming upon heating to fusion and is also thermally stable. This component is well known in primer applications for non-stick finishes, for adhering a fluoropolymer-containing primer layer to substrates and for film-forming within and as part of a primer layer. The fluoropolymer by itself has little to no adhesion to a smooth substrate. The binder is generally non-fluorine containing and yet adheres to the fluoropolymer. Preferred binders are those that are soluble or solubilized in water or a mixture of water and organic solvent for the binder, which solvent is miscible with water. This solubility aids in the blending of the binder with the fluorocarbon component in the aqueous dispersion form.

An example of the binder component is polyamic acid salt which converts to polyamideimide (PAI) upon baking of the composition to form the primer layer. This binder is preferred because in the fully imidized form obtained by baking the polyamic acid salt, this binder has a continuous service temperature in excess of 250° C. The polyamic acid salt is generally available as polyamic acid having an inherent viscosity of at least 0.1 as measured as a 0.5 wt % solution in N,N-dimethylacetamide at 30° C. It is dissolved in a coalescing agent such as N-methylpyrrolidone, and a viscosity-reducing agent, such a furfuryl alcohol and reacted with tertiary amine, preferably triethylamine, to form the salt, which is soluble in water, as described in greater detail in U.S. Pat. No. 4,014,834 (Concannon). The resultant reaction medium containing the polyamic acid salt can then be blended with the fluoropolymer aqueous dispersion, and because the coalescing agent and viscosity-reducing agent are miscible in water, the blending produces a uniform coating composition. The blending can be achieved by simple mixing of the liquids together without using excess agitation so as to avoid coagulation of the fluoropolymer aqueous dispersion. Other binders that can be used include polyether sulfone(PES) and polyphenylene sulfide (PPS).

Whether the primer composition is applied as a liquid medium, wherein the liquid is water and/or organic solvent, the adhesion properties described above will manifest themselves upon drying and baking of the primer layer together with baking of the next-applied layer of fluoropolymer to form the non-stick coating of the substrate.

For simplicity, only one binder may be used to form the binder component of the composition of the present invention. However, multiple binders are also contemplated for use in this invention, especially when certain end-use properties are desired, such as flexibility, hardness, or corrosion protection. Common combinations include PAI/PES, PAI/PPS and PES/PPS.

The proportion of fluoropolymer and binder, especially if the composition is used as a primer layer on a smooth substrate, is preferably in the weight ratio of 0.5 to 2.0:1. The weight ratios of fluoropolymer to binder disclosed herein are based on the weight of these components in the applied layer formed by baking the composition after application to its substrate. The baking drives off the volatile materials present in the coating composition, including the salt moiety of the polyamic acid salt as the imide bonds are formed during baking. For convenience, the weight of binder, when it is polyamic acid salt which is converted to polyamideimide by the baking step, can be taken as the weight of polyamic acid in the starting composition, whereby the weight ratio of fluoropolymer to binder can be determined from the amount of fluoropolymer and binder in the starting composition. When the composition of the invention is in the preferred aqueous dispersion form, these components will constitute about 5 to 50 wt % of the total dispersion.

Silicon Carbide Particles

The undercoat of the present invention contains silicon carbide particles, which is an inorganic filler film hardener component. Preferably, when the undercoat is multilayer, e.g. primer/intermediate layer, the primer layer comprise silicon carbide particles. According to another embodiment of the present invention, both the primer and intermediate layers contain silicon carbide particles. This material is inert with respect to the other components of the composition and thermally stable at its eventual baking temperature which fuses the fluoropolymer and binder. The film hardener is water insoluble so that it is typically uniformly dispersible but not dissolved in the aqueous dispersion form of the composition of the invention. Preferably the silicon carbide particles have a mean average particle size in the range of about 3 to about 100 micrometers, more preferably in the range of about 5 to about 45 micrometers.

The silicon carbide particles of the inorganic film hardener preferably have a Knoop hardness of 2500. Knoop hardness is a scale for describing the resistance of a material to indentation or scratching. Values for the hardness of minerals and ceramics are listed in the *Handbook of Chemistry*, 77$^{th}$ Edition, 12-186,187 based on reference material from Shackelford and Alexander, *CRC Materials Science and Engineering Handbook,* CRC Press, Boca Raton Fla., 1991. The film hardener component imparts durability to the non-stick fluoropolymer composition applied as a coating on a substrate by deflecting abrasive forces applied to the coating surface and by resisting penetration of sharp objects that have penetrated the fluoropolymer overcoat.

The silicon carbide particles of the inorganic film hardener preferably have an aspect ratio (as defined above) of not greater than 2.5, and more preferably not greater than 1.5. Preferred particles of this invention, which are able to deflect abrasive forces applied to a coating containing the particles, have an aspect ratio of not greater than 2.5 and a size wherein the largest diameter of the particle is at least 50% of the coating thickness and does not exceed 125% of the coating film thickness.

In a preferred embodiment, the undercoat comprises at least about 2 wt % of SiC particles, preferably about 2-45 wt %, based on the dry weight of the undercoat composition. The dry weight bases disclosed herein are the baked weights, i.e. wherein all volatiles are driven off during baking of the release coating. When the undercoat is multilayer, these amounts of SiC can be present in the primer layer and in the intermediate layer.

Other Fillers

In addition to the silicon carbide particles present in the undercoat, the undercoat may contain other filler materials (inorganic filler film hardeners) having high Knoop hardness of greater than 1200 as well as low value of less than 1200. In the embodiment wherein the undercoat is mulitlayer, such materials are preferably have a Knoop hardness of greater than 1200 and are present in the primer layer, and more preferably, in the intermediate layer as well. The presence of other inorganic filler film hardeners along with the SiC particles increases the abrasion resistance of the overall release coating. Examples of inorganic filler film hardener include inorganic oxides, carbides, borides and nitrides having a Knoop hardness of at least 1200. Preferred are inorganic oxides, nitrides, borides and carbides of zirconium, tantalum, titanium, tungsten, boron, aluminum and beryllium. Preferably, the intermediate layer and/or the primer layer comprise aluminum oxide. Typical Knoop hardness values for preferred inorganic compositions are: zirconia (1200); aluminum nitride (1225); beryllia (1300); zirconium nitride (1510); zirconium boride (1560); titanium nitride (1770); tantalum carbide (1800); tungsten carbide (1880); alumina (2025); zirconium carbide (2150); titanium carbide (2470); silicon carbide (2500); aluminum boride (2500); titanium boride (2850).

Suitable additional fillers of lower Knoop harness values include glass flake, glass bead, glass fiber, aluminum or zirconium silicate, mica, metal flake, metal fiber, fine ceramic powders, silicon dioxide, barium sulfate, talc, etc.

Preferably the undercoat contains at least about 5 wt % of inorganic filler film hardener other than SiC, based on the dry weight of the undercoat composition. When the undercoat is multilayer, preferably the primer layer contains about 10-40 wt % of inorganic filler film hardener other than SiC.

Magnetizable Flakes

The undercoat contains magnetizable flakes. When the undercoat is multilayer, preferably, the intermediate layer of the undercoat comprises the flakes. Further preferably, at least a portion of said flakes have no induced orientation. In the Muchin and Leck patents, orientation of the magnetizable flakes is disclosed and purported to aid in the conduct of heat applied to the underside of a flat bottom such as a fry pan from the primer to top surface of the coating. Flakes which are exposed to magnetic force are oriented generally in the direction of the thickness of coating.

Without the application of magnetic force to the coating, the magnetizable flakes orient parallel to the plane of the layer and the substrate being coated. Thus, it has been found, that there is no need for application of a magnetic force to the flake when SiC particles are present. Surprisingly, the application of an undercoat to a substrate, containing magnetizable flakes in combination with silicon carbide particles effects improved heat transfer properties over conventional release coating systems, even those systems which contain oriented magnetizable flakes. The flakes in the release coating should be made of material that while magnetizable, are unaffected by such heating. Examples of material from which the flakes can be made include such metals as iron and nickel and alloys containing these metals, with stainless steel being the preferred material. Metals are much more thermally conductive that the polymers in the release coating. For simplicity, the fluoropolymer/flake coating composition is referred to as a release coating both before and after the baking step, when in fact the baking step is necessary before the release (non-stick) characteristic is realized.

The magnetizable flakes include flakes which have a longest dimension which is greater and or less than the thickness of the layer formed from the coating composition which contains the flakes. The layer (coating) thickness will generally be from 5 to 40 micrometers thick. The flake size will then depend on the layer thickness desired. Particularly useful are 316L stainless steel flakes having an average longest dimension of from 20 to 60 micrometers, and normally, the flakes will be a mixture of sizes in which a substantial proportion, preferably at least 40 wt %, has a longest dimension of at least 44 micrometers.

Preferred magnetizable flake-containing dry undercoat compositions, whether monolayer or multilayer, include those containing 70 to 90 wt % fluoropolymer, 2 to 10 wt % magnetizable flakes, more preferably 2 to 7 wt %, and 2 to 20 wt % SiC particles with 2 to 15 wt % of polymer binder. The fluoropolymer component is preferably a blend of 50 to 95 wt % PTFE and 5 to 50 wt % melt-fabricable tetrafluoroethylene copolymer, such as PTFE/PAVE described above, based on the combined weight of these two fluoropolymers. In the liquid form, the liquid medium will generally constitute 75 to 95 wt % of the combined weight of the liquid medium and the three components described above.

Application

The compositions of the present invention can be applied to substrates by conventional means. Spray and roller application are the most convenient application methods, depending on the substrate being coated. Other well-known coating methods including dipping and coil coating are suitable. The non-stick coating compositions may be a single coat or a multi-coat system comprising an undercoat and an overcoat. The overcoat of one or more fluoropolymer-containing layers can be applied by conventional methods to the undercoat layer prior to its drying. When the undercoat and overcoat layer compositions are aqueous dispersions, the overcoat composition can be applied to the undercoat layer preferably after drying to touch. When the undercoat layer is made by applying the composition from an organic solvent, and the next layer (intermediate layer or topcoat) is applied from an aqueous medium, the undercoat layer should be dried so that all water-incompatible solvent is removed before application of such next layer.

The applied coating system can be baked to fuse all the coatings at the same time to form a non-stick, release coating on the substrate. When the fluoropolymer is PTFE, a quick high bake temperature is preferred, e.g., for 5 min. at a temperature starting at 800° F. (427° C.) and rising to 825° F. (440° C.). When the fluoropolymer in the primer or the overcoat is a blend of PTFE and FEP, e.g., 50-70 wt % PTFE and 50-30 wt % FEP, the bake temperature may be reduced to 780° F. (415° C.), rising to 800° F. (427° C.) in 3 minutes (total bake time). The baked undercoat layer thickness is measured with film thickness instruments based on the eddy-current principle (ASTM B244) or magnetic induction principle (ASTM B499).

In preferred embodiments, the release coating of this invention has a total dry film thickness of from 32 to 40 micrometers, with the undercoat having a preferred DFT of 22 to 30 micrometers, and the overcoat having a preferred DFT of 8 to 10 micrometers. In the more preferred embodiment the undercoat comprises a primer having a DFT of 7.5 to 10 and an intermediate layer of 15 to 22.

In the resultant structure, the substrate can be of any material which can withstand the bake temperature, such as metal and ceramics, examples of which include aluminum, anodized aluminum, cold-rolled steel, stainless steel, enamel, glass, and pyroceram. The substrate can have a roughened surface, such as by grit blasting or chemical etching to create cavities to which the release coating can anchor. Preferably, however, the substrate has a smooth surface which saves the need for the cookware manufacturer to roughen the substrate surface. In this embodiment, the layer containing the flakes is adhered to the substrate via a primer layer.

The substrate can be smooth, i.e. having a surface profile of less than 50 microinches (1.25 micrometers) as measured by a profilometer, e.g. a PocketSurf® model surface tester made by Mahr GmbH of Gottingen, Germany, and needs to be clean. For pyroceram and some glass, improved results are obtained by activation of the substrate surface such as by a slight chemical etch, which is not visible to the naked eye, i.e., the surface is still smooth. The substrate can also be chemically treated with an adhesion agent such as a mist coat of polyamic acid salt, such as disclosed in U.S. Pat. No. 5,079,073 to Tannenbaum. When the undercoat layer is a primer, it can be considered as the first fluoropolymer-containing layer on the substrate, and preferably the primer layer is directly bonded to the substrate.

Performance Characteristics

The improved heat transfer of a structure of this invention is manifested by the reduced ramp up time required once heat is applied to the underside of the structure to achieve cooking temperatures, e.g., as demonstrated in the examples with heating to 400° F. (204° C.).

The enhanced thermal performance of the invention can be illustrated using a controlled heat source with IR monitoring. An aluminum substrate (fry pan) is coated with the undercoat described in the invention and a standard overcoat. The structure is compared to a typical prior art fluoropolymer non-stick undercoats having the standard overcoat on the same aluminum base substrates and the same coating thicknesses. The structures are compared side by side. The temperature monitoring apparatus used was a Thermacam PM280 IR thermograph video camera manufactured by Inframetrics with time and temperature capability that records a video of the pans being heated. The pans are placed on a Waage electric stove DDSF15 (550-1100 watt-dual element) calibrated to 400° F. (204° C.) across the ceramic surface. At ambient room temperature both pans appear black in the video. As the heat from the source is transferred through the pan, the appearance of the viewed surface begins to brighten until it reaches a luminescent golden appearance. The aluminum pan coated with the undercoat invention reached the set point temperature and bright, gold appearance at a faster rate than the standard fluoropolymer non-stick coating.

The identical side by side comparison is repeated on aluminum clad stainless steel substrate (fry pan). The recorded video shows the standard fluoropolymer non-stick coating to have a section of the pan begin to heat up at a faster rate than the invention. However, as the test progresses, the pan with the undercoat of the invention is shown to heat up more uniformly and reach cooking temperature at a faster rate across the entire surface of the pan as compared to the standard fluoropolymer non-stick coating. The standard fluoropolymer non-stick coating shows what is typically called a "hot spot" and does not heat up uniformly. This effect of better heat distribution of the invention is consistent across substrates and coating types. This is exhibited by the equal gradient of color change across the visual surface of the invention as opposed to the standard fluoropolymer coated pan. The advantage of the even heat distribution allows the coated pan to cook foods more evenly across the entire surface of the pan.

The coated substrate of the present invention may be in the form of numerous articles of cookware such as frying pans, pots, casseroles, woks, griddles, rice cookers and inserts therefor, as well as non cookware items that benefit from fast heat up times such as iron sole plates and the like.

TEST METHODS

SBAR Test:

A coated substrate is evaluated for abrasion resistance of the non-stick coatings using the SBAR test. This test is based on the British Standard Specification for cookware BS 7069: 1988 in which the coating system is subjected to an abrasive pad attached on a vertical arm with reciprocal horizontal movement. The apparatus performs an arm reciprocal horizontal movement of 100 mm±5 mm (4 in.+/−0.25 in.) from cylinder center at an average speed of ±10 m/min. The abrasive pad (3M Scotch-Brite 07447) is a random nylon web impregnated with phenolic resin and aluminum oxide is secured to the cylinder and loaded to apply a total force of ±15 N (mass of arm+dead weight=0.5 kg or 10 lbs) on the coating. The test sample is prepared by coating a substrate as explained in the examples with drying and baking as specified. The coated substrate is washed with clear water and dried gently before testing. The test is run on dry and wet substrate as explained below.

The coated substrate is fixed on a fixed support and the loaded abrasive pad is applied on the non-stick surface. For running the procedure wet, the surface is lubricated by adding 50 ml of a dishwashing solution containing 5 g mild detergent in one liter (33 oz) solution. The dry procedure is run without adding the detergent solution and all other procedures remain the same. The specimen is kept stationary and the abrasive pad arm is moved backwards and forwards over a distance of 50 mm±2.5 mm (2 in+/−0.1 in) on both sides of the cylinder center point.

The abrasive pad is turned after 250 cycles and renewed after another 250 cycles. This procedure is continued until metal is visible and then the number of cycles for coating breakthrough is recorded. Coating breakthrough is the final point of the test. Breakthrough pattern must be similar to pictures in attachment Contact Method—Ramp Up Time to Cook Temperature:

The test for measuring the effect of temperature ramping and heat distribution by contact method is described as follows:

The energy source was a specially made ceramic surface hot plate from Wenesco, Chicago, Ill. This hot plate has high uniformity control, will decrease any point to point plate temperature variation to as close as 2% of set point. The data acquisition was compiled using a temperature profiler from Datapaq, Cambridge, UK (Wilmington, Mass.). The model was a Datapaq 9000 Tracker system with 6 temperature inputs. The hot plate was calibrated to a temperature in the range of 410° F. (210° C.). Six "K"-type thermocouple wires were connected to the interior of the pan in the shape of a cross with four contacts across one center line and 2 contacts at the opposite exterior points of the other center line.

The thermocouple connectors were inserted into the transducer interface and the interface connected to the data logger (memory paq). The pan was placed on the center of the calibrated hot plate for 10 minutes. The pan was then removed and the data logger downloaded into the Datapaq statistical software program. Key analysis functions of the program include Datapaq Value, max/min temperature, time at temperature, slope calculation, rise and fall calculation, & peak difference. Results are recorded in seconds to reach a cooking temperature of 400° F. (204°). The data from each test can be compared to the directly to other runs of data acquisition.

Mechanical Tiger Paw Abrasion Test (MTP Abrasion Test)

As described in U.S. Pat. No. 6,761,964 A1 to Tannenbaum, a coated substrate is evaluated for abrasion resistance by continuously rotating three weighted ballpoint pen tips on the surface of the coated substrate while the substrate is heated and oscillated back and forth on a shaker table. The equipment used for testing comprises a frame onto which is mounted drive motor. Extending from the motor is a central flywheel drive shaft on which is positioned a flywheel (drive disc). The drive disc is aluminum sheeting having a diameter of 7 inches (18 cm) and thickness of 0.25 inch (0.64 cm). Housed within the frame is a shaker table on which is mounted on a hot plate. The top of the hot plate provides a surface for placing a test substrate such as a frying pan. The vertical distance between surface and the bottom of the drive disc is approximately 6 inches (15 cm). At starting position, the flywheel drive shaft is perpendicular and centered with the hot plate. The shaker table is mounted to the frame so that the center of its reciprocating motion is coincident with the center of the flywheel drive shaft. The direction of reciprocating motion is front-to-back.

A tiger paw head is mounted to the drive disc by a floating shaft positioned in support a shaft tube. The support tube is flexibly connected through the drive disc with the aid of O-rings, washers and nuts on both sides of the disc. Above the connection, additional washers are added to the shaft to provide additional weight. The support tube is mounted off-center, approximately 2 inches (5 cm) from the flywheel drive shaft. An adjustment screw bears against support the shaft tube and permits alignment of the floating shaft articulated within the support shaft tube. Also, positioned on the disc, 180 degrees from the support tube, is a counterbalancing weight.

The tiger paw head is a rotating disc with three channels positioned near the perimeter of the disc at equidistant angles from the center (i.e., approximately 0, 120, 240 degrees). The channels are sized to each house a ballpoint pen refill. Set screws are positioned in the side wall of the disc at the location of each channel to lock the pen refills in place during operation. The rotating disc as shown is stainless steel having a diameter of 2.5 inches (6.4 cm) and thickness of 0.4 inch (1 cm). The center of the disc accommodates a ball bearing and allows the disc to be attached to the floating shaft by a coupling. The tiger paw head is free to rotate around the floating shaft.

In operation, a fry pan with coated aluminum substrate is washed in mild detergent to remove any dirt or oil. The test pan is placed on hot plate with the aid of a removable centering rod temporarily installed in a central drive shaft. The centering rod acts a plumb line for pan placement on the surface of the hot plate after which the centering rod is removed. For each test, three new pen refills are installed in the channels of the tiger paw head so that each refill extends downward ¾ inch (1.9 cm) from the bottom of the disc. The tiger paw head is attached to the floating shaft that extends down from the drive disc attached to the drive shaft. The weight of the tiger paw head and floating shaft is regulated. In the equipment illustrated, the weight is approximately 400 g. The combined weight of the floating shaft and washers (all approximately 115 g), the tiger paw head (approximately 279 g), and the ballpoint pen points (approximately 10 g) totals 404 g. The counterbalancing weight also totals approximately 400 g.

The hot plate is turned on and the test substrate (pan) is heated to a temperature of 400° F.+/−10° F. (204° C.+/−6° C.). When the pan reaches test temperature as determined by infrared temperature measurement on the substrate surface, the pen refills are lowered onto the pan and the equipment is activated to begin the shaker table oscillation and tiger paw head rotation. In this way, the testing equipment rotates the pens against and around the surface of the coated substrate. The speed of tiger paw head rotation is controlled at 30 rotations per minute. The speed of the shaker table is controlled for 30 back and forth oscillations per minute. A counter records the number of cycles completed. A timer counts down each 15 minute period of tiger paw rotation in a particular direction. Data is recorded at 15-minute intervals. The rotation of the tiger paw head is reversed after each 15-minute period. Periodically the pen refill points are inspected for build-up of coating. Built-up coating is removed as necessary.

Failure of the coating on substrate is monitored by observing the oval-shaped paths that evolve as the points of the pen refills penetrate through the coating to reach the bare metal substrate. By heating the substrate, the time to failure is accelerated. The longer the time to failure, the better the durability of the non-stick coating.

At the end of each 15-minute cycle, the pan is evaluated according to the following MTP numerical ratings:

| | |
|---|---|
| 10 | New Pan |
| 9 | Grooves in coating |
| 8 | First nick to metal (for on smooth substrates) |
| | Roughening of surface (for grit blasted substrates) |
| 7 | Lines to metal (outside and/or inside) |
| 6 | Oval beginning outside |
| 5 | Oval complete |

Accelerated Tiger Paw Cooking (ATP)

The Accelerated Tiger Paw cooking test is an accelerated lower temperature version of the Tiger Paw cooking test explained above. The test evaluates substrates such as fry pans for cooking performance and abrasion resistance by exposing the coating system to cycles of acid, salt and fat and detergent. The substrate is subjected to heat and the manual rotation of a tiger paw head during cooking. The food cycles, temperature conditions and number of tiger paw head rotations are altered as explained below.

For each test, coated pans plus a control pan are tested on a commercial gas stove top with sufficient burners to cook all pans simultaneously. The control pan is a standard is a pan coated with a known commercial cookware coating system for which the standard properties being judged have been predetermined many times. The temperature for the test is maintained at 380° F. (193° C.) to 400° F. (204° C.) as measured by a contact pyrometer on the substrate surface. The pans are methodically rotated among all burners.

In operation, the test pans position are placed on the burners and heated to within the specified temperature range. The pans are subjected to the following cooking process.

An egg is fried in an unseasoned pan. The egg is cooked for 3 minutes. The egg is lifted with a spatula and the pan is tilted to allow for the egg to slide. The ease with which the egg slides is assessed. The pan is returned to the burner and the egg is turned over. The yolk of the egg is broken with a spatula and the egg is cooked for two more minutes. The egg is again lifted with a spatula and the ease with which the egg slides is determined based on the scale designated "release" described above. The pan is also rated for scratch. The pan is rinsed in hot water and wiped out with a paper towel.

Cook 1: One tablespoon of corn oil is placed in the center of the pan. A preformed hamburger patty salted with ¼ teaspoon of salt on one side is placed salt side down on the oil. The patty is cooked for 3 minutes. Then a lid is placed on the fry pan and the patty is cooked for 4 more minutes with the lid on. With the edge of a spoon the patty is cut first into fourths and each fourth is cut into thirds. The meat is removed and the pan is wiped out with a paper towel.

Two cups (16 oz.) of prepared tomato sauce mixture (30 oz. tomato sauce, ½ cup salt, 3 qt. water) is added to each pan and simmered for 20 minutes. During this 20-minute simmer period the scratch abuse test is performed using the tiger paw head. The mixture is stirred in each pan with the tiger paw head in a circular pattern for 50 revolutions in a clockwise direction and with 50 more revolutions in a counter clockwise direction. At the conclusion of the 20-minute simmer period, the pans are removed from the burners, contents are emptied and each pan is washed thoroughly with a detergent solution. The pan is rinsed in clear water and wiped dry.

The pans are returned to the burner and the cooking procedure beginning with placing one tablespoon of oil in the center of the pan is repeated.

After every 4 cooks, an egg is fried as described above and the pan is rated for release and scratch. At the end of every 7 cooks (or if 7 cooks cannot be completed, at the end of each day) each pan is filled with a detergent solution of 2 cups of water, 1 teaspoon of liquid detergent and 3 teaspoons of salt. The detergent is brought to a boil and a lid is placed over the pan. The pan is removed from the burner and allowed to stand overnight. The next day the cycle begins with frying an egg and rating the pan. Testing continues until a pan is determined to have a scratch rating of 5 at which time testing stops. Scratch uses the same scale as that used in the TP test. The release scale is listed below.

Release (0-5): The release rating is determined by assessing how easily the egg slides and how much of the egg sticks to the pan.

| | |
|---|---|
| 5 | Excellent |
| 4 | Very good |
| 3 | Good |
| 2 | Fair |
| 1 | Severe |
| 0 | Very Severe |

AIHAT

A coated substrate such as a fry pan is subjected to a series of high temperature cooking cycles using common household metal cooking utensils (fork, spatula, whisk, knife). A description of the test is described in U.S. Pat. No. 5,250,356 (Batzar) column 3, lines 11-64. The test is a measure of mar and scratch from common cooking abuse.

Dried Film Thickness (DFT)

The baked coating thickness is measured with a film thickness instrument, e.g., Fisherscope, based on the eddy-current principle (ASTM B244).

EXAMPLES

Fluoropolymer

PTFE dispersion: DuPont TFE fluoropolymer resin dispersion grade 30, available from the DuPont Company, Wilmington, Del.

FEP dispersion: TFE/HFP fluoropolymer resin dispersion with a solids content of from 54.5-56.5 wt % and RDPS of from 150-210 nanometers, the resin having an HFP content of from 9.3-12.4 wt % and a melt flow rate of 11.8-21.3 measured at 372° C. by the method of ASTM D-1238 modified as described in U.S. Pat. No. 4,380,618.

PFA dispersion: DuPont PFA fluoropolymer resin dispersion grade 335, available from the DuPont Company, Wilmington, Del.

Polymer Binder

PAI is Torlon® AI-10 poly(amide-imide) (Amoco Chemicals Corp.), a solid resin (which can be reverted to polyamic salt) containing 6-8% of residual NMP.

Polyamic acid salt is generally available as polyamic acid having an inherent viscosity of at least 0.1 as measured as a 0.5 wt % solution in N,N-dimethylacetamide at 30° C. It is dissolved in a coalescing agent such as N-methyl pyrrolidone, and a viscosity reducing agent, such as furfuryl alcohol and reacted with tertiary amine, preferably triethyl amine to form the salt which is soluble in water, as described in greater detail in U.S. Pat. No. 4,014,834 (Concannon).

Silicon Carbide Particles

Silicon carbide supplied by Elektroschmelzwerk Kempten GmbH (ESK), Munich Germany are used in a variety of sizes and mixtures.

P1200=3.0±0.5 micrometers mean average particle size
P1000=4.5±0.5 micrometers mean average particle size
P800=6.5±1.0 micrometers mean average particle size
P600=9.3±1.0 micrometers mean average particle size P400=17.3±1.5 micrometers mean average particle size
P320=29.2±1.5 micrometers mean average particle size
P280=36.5±1.5 micrometers mean average particle size
P240=44.5±2.0 micrometers mean average particle size The mean average particle size ($d_{s50}$) is measured by sedimentation using FEPA-Standard-43-GB 1984R 1993 resp. ISO 8486 according to information provided by the supplier.

Other Inorganic Film Hardener

Aluminum oxide (small particles) are supplied by Aluminum Corporation of America—Grade SG A-16 with an average particle size 0.35-0.50 micrometers A 3-coat non-stick system representative of the invention is sprayed onto test pans of smooth aluminum that have been treated only by washing to remove grease but not mechanically roughened. The aqueous dispersion compositions of the primer, intermediate coat and an overcoat. The dried coating thicknesses (DFT) for primer/intermediate layer/overcoat are determined from eddy current analysis to be 0.4 mils (10.2 micrometers)/0.7 mils (17.8 micrometers)/0.3 mils (7.6 micrometers).

The primer layers and intermediate layers are listed in Tables of each example. The fluoropolymer overcoat for all of the examples is listed in Table 1.

The primer is sprayed onto the aluminum substrate and dried at 150° F. (66° C.) for 5 minutes. The intermediate coat is then sprayed over the dried primer. The topcoat is applied (sprayed) wet on wet to the intermediate coat. The coating is cured by baking at a temperature of 800° F. (427° C.) for 5 minutes.

Pans are subjected to tests to determine 1) abrasion resistance, 2) ramp up time to cooking temperature, and 3) release. Test Results for all system are listed in Table 16.

TABLE 1

Overcoat

| Ingredients | Weight Percent |
|---|---|
| PTFE (solids in aqueous dispersion) | 39.677 |
| Water | 36.591 |
| Octylphenolpolyethoxy Surfactant | 4.612 |
| PFA (solids in aqueous dispersion) | 2.089 |
| Mica Iriodin 153 from Merck | 0.371 |
| Cerium Octoate | 0.590 |
| Oleic Acid | 1.030 |
| Triethanolamine | 4.591 |
| Butylcarbitol | 2.395 |
| Acrylic Resin | 5.170 |
| Hydrocarbon Solvent | 2.884 |
| | 100.000 |

Comparative Example 1—No SiC Particles, No Magnetizable Flakes

TABLE 2

Primer Composition - Comp. Ex 1

| Ingredients | Weight Percent |
|---|---|
| PAI-1 | 5.089 |
| Water | 68.438 |
| PTFE (solids in aqueous dispersion) | 4.908 |
| FEP (solids in aqueous dispersion) | 3.232 |
| Furfuryl Alcohol | 3.982 |
| Diethylethanolamine | 0.718 |
| Triethylamine | 1.436 |

TABLE 2-continued

Primer Composition - Comp. Ex 1

| Ingredients | Weight Percent |
|---|---|
| Triethanolamine | 0.003 |
| N-Methylpyrrolidone | 3.051 |
| Ultramarine Blue Pigment | 7.181 |
| Ludox AM Polysilicate | 1.073 |
| Sodium Naphthalenesulfonic Acid | 0.011 |
| Alkylphenolethoxy Surfactant | 0.617 |
| Mica/Titanium Dioxide/Tin Oxide | 0.044 |
| Kaolin | 0.217 |
| | 100.000 |

TABLE 3

Intermediate Layer Composition - Comp. Ex 1

| Ingredients | Weight Percent |
|---|---|
| PTFE (solids in aqueous dispersion) | 31.428 |
| Water | 40.423 |
| Octylphenolpolyethoxy Surfactant | 4.963 |
| PFA (solids in aqueous dispersion) | 5.681 |
| Carbon Black | 0.764 |
| Mica/Titanium Dioxide/Tin Oxide | 0.704 |
| Ultramarine Blue Pigment | 0.235 |
| Cerium Octoate | 0.550 |
| Oleic Acid | 1.206 |
| Triethanolamine | 4.366 |
| Butylcarbitol | 2.285 |
| Acrylic Resin | 4.540 |
| Hydrocarbon Solvent | 2.798 |
| Sodiumnaphthalenesulfonic Acid | 0.057 |
| | 100.000 |

Comparative Example 2—No SiC Particles

TABLE 4

Primer Composition - Comp. Ex. 2

| Ingredients | Weight Percent |
|---|---|
| PAI-1 | 5.089 |
| Water | 68.438 |
| PTFE (solids in aqueous dispersion) | 4.908 |
| FEP (solids in aqueous dispersion) | 3.232 |
| Furfuryl Alcohol | 3.982 |
| Diethylethanolamine | 0.718 |
| Triethylamine | 1.436 |
| Triethanolamine | 0.003 |
| N-Methylpyrrolidone | 3.051 |
| Ultramarine Blue Pigment | 7.181 |
| Ludox AM Polysilicate | 1.073 |
| Sodium Naphthalenesulfonic Acid | 0.011 |
| Alkylphenolethoxy Surfactant | 0.617 |
| Mica/Titanium Dioxide/Tin Oxide | 0.044 |
| Kaolin | 0.217 |
| | 100.000 |

TABLE 5

Intermediate Layer Composition - Comp. Ex. 2

| Ingredients | Weight Percent |
|---|---|
| PTFE (solids in aqueous dispersion) | 33.980 |
| Water | 37.319 |
| Octylphenolpolyethoxy Surfactant | 4.248 |
| PFA (solids in aqueous dispersion) | 6.132 |
| Stainless Steel Flake 316L Water grade | 1.592 |
| Amorphous Silica | 0.184 |
| PAI-1 | 0.052 |
| Cerium Octoate | 0.590 |
| Oleic Acid | 1.030 |
| Triethanolamine | 4.646 |
| Butylcarbitol | 2.424 |
| Acrylic Resin | 4.880 |
| Hydrocarbon Solvent | 2.889 |
| Sodiumnaphthalenesulfonic Acid | 0.034 |
| | 100.000 |

Comparative Example 3—No Magnetizable Flakes

TABLE 6

Primer Composition - Comp. Ex. 3

| Ingredients | Weight Percent |
|---|---|
| PAI-1 | 4.646 |
| Water | 62.629 |
| PTFE (solids in aqueous dispersion) | 4.192 |
| FEP (solids in aqueous dispersion) | 2.850 |
| Furfuryl Alcohol | 3.579 |
| Diethylethanolamine | 0.656 |
| Triethylamine | 1.311 |
| Triethanolamine | 0.012 |
| N-Methylpyrrolidone | 2.785 |
| P600 Silicon Carbide particles (amps* = 10 micrometers) | 5.326 |
| Carbon Black Pigment | 0.311 |
| Ultramarine Blue Pigment | 1.762 |
| Aluminum Oxide (0.35-0.50 micrometers) | 8.153 |
| Ludox AM Polysilicate | 0.946 |
| Sodium Naphthalenesulfonic Acid | 0.176 |
| Alkylphenolethoxy Surfactant | 0.642 |
| Hydroxypropyl Cellulose | 0.024 |
| | 100.000 |

*amps = mean average particle size

TABLE 7

Intermediate Layer Composition - Comp. Ex. 3

| Ingredients | Weight Percent |
|---|---|
| PTFE (solids in aqueous dispersion) | 28.486 |
| Water | 39.107 |
| Octylphenolpolyethoxy Surfactant | 3.722 |
| PFA (solids in aqueous dispersion) | 5.012 |
| Aluminum Oxide | 6.562 |
| Carbon Black | 1.046 |
| Ultramarine Blue Pigment | 0.279 |
| Mica/Titanium Dioxide/Tin Oxide | 0.734 |
| Hydroxypropyl Cellulose | 0.019 |
| Cerium Octoate | 0.491 |
| Oleic Acid | 0.921 |
| Triethanolamine | 3.907 |
| Butylcarbitol | 2.037 |
| Acrylic Resin | 5.130 |
| Hydrocarbon Solvent | 2.490 |
| Sodiumnaphthalenesulfonic Acid | 0.057 |
| | 100.000 |

The examples presented below have varying amounts and sizes of SiC particles in the primer layer in conjunction with SS flakes in the intermediate layer.

Example 1—SS in the Intermediate Layer

TABLE 8

Primer Composition - Example 1

| Ingredients | Weight Percent |
|---|---|
| PAI-1 | 4.646 |
| Water | 62.629 |
| PTFE (solids in aqueous dispersion) | 4.192 |
| FEP (solids in aqueous dispersion) | 2.850 |
| Furfuryl Alcohol | 3.579 |
| Diethylethanolamine | 0.656 |
| Triethylamine | 1.311 |
| Triethanolamine | 0.012 |
| N-Methylpyrrolidone | 2.785 |
| P600 Silicon Carbide particles (amps* = 10 micrometers) | 5.326 |
| Carbon Black Pigment | 0.311 |
| Ultramarine Blue Pigment | 1.762 |
| Aluminum Oxide (0.35-0.50 micrometers) | 8.153 |
| Ludox AM Polysilicate | 0.946 |
| Sodium Naphthalenesulfonic Acid | 0.176 |
| Alkylphenolethoxy Surfactant | 0.642 |
| Hydroxypropyl Cellulose | 0.024 |
| | 100.000 |

*amps = mean average particle size

TABLE 9

Intermediate Layer Composition - Example 1

| Ingredients | Weight Percent |
|---|---|
| PTFE (solids in aqueous dispersion) | 33.980 |
| Water | 37.319 |
| Octylphenolpolyethoxy Surfactant | 4.248 |
| PFA (solids in aqueous dispersion) | 6.132 |
| Stainless Steel Flake 316L Water grade | 1.592 |
| Amorphous Silica | 0.184 |
| PAI-1 | 0.052 |
| Cerium Octoate | 0.590 |
| Oleic Acid | 1.030 |
| Triethanolamine | 4.646 |
| Butylcarbitol | 2.424 |
| Acrylic Resin | 4.880 |
| Hydrocarbon Solvent | 2.889 |
| Sodiumnaphthalenesulfonic Acid | 0.034 |
| | 100.000 |

Example 2—SS and Al$_2$O$_3$ in the Intermediate Layer

TABLE 10

Primer Composition - Example 2

| Ingredients | Weight Percent |
|---|---|
| PAI-1 | 4.646 |
| Water | 62.629 |
| PTFE (solids in aqueous dispersion) | 4.192 |
| FEP (solids in aqueous dispersion) | 2.850 |
| Furfuryl Alcohol | 3.579 |
| Diethylethanolamine | 0.656 |
| Triethylamine | 1.311 |
| Triethanolamine | 0.012 |
| N-Methylpyrrolidone | 2.785 |
| P600 Silicon Carbide particles (amps* = 10 micrometers) | 5.326 |
| Carbon Black Pigment | 0.311 |
| Ultramarine Blue Pigment | 1.762 |
| Aluminum Oxide (0.35-0.50 micrometers) | 8.153 |
| Ludox AM Polysilicate | 0.946 |
| Sodium Naphthalenesulfonic Acid | 0.176 |
| Alkylphenolethoxy Surfactant | 0.642 |
| Hydroxypropyl Cellulose | 0.024 |
| | 100.000 |

*amps = mean average particle size

TABLE 11

Intermediate Layer Composition - Example 2

| Ingredients | Weight Percent |
|---|---|
| PTFE (solids in aqueous dispersion) | 27.309 |
| Water | 39.687 |
| Octylphenolpolyethoxy Surfactant | 3.600 |
| PFA (solids in aqueous dispersion) | 4.802 |
| Carbon Black | 1.002 |
| Ultramarine Blue Pigment | 0.267 |
| Aluminum Oxide | 6.285 |
| Stainless Steel Flake 316L Water grade | 1.557 |
| Mica/Titanium Dioxide/Tin Oxide | 0.703 |
| Amorphous Silica | 0.180 |
| Hydroxypropyl Cellulose | 0.079 |
| PAI-1 | 0.051 |
| Cerium Octoate | 0.470 |
| Oleic Acid | 0.882 |
| Triethanolamine | 3.743 |
| Butylcarbitol | 1.952 |
| Acrylic Resin | 4.914 |
| Hydrocarbon Solvent | 2.291 |
| Sodiumnaphthalenesulfonic Acid | 0.226 |
| | 100.000 |

Example 3

SS in the Intermediate Layer

TABLE 12

Primer Composition - Example 3

| Ingredients | Weight Percent |
|---|---|
| PAI-1 | 4.784 |
| Water | 61.795 |
| PTFE (solids in aqueous dispersion) | 2.868 |
| FEP (solids in aqueous dispersion) | 1.937 |
| Furfuryl Alcohol | 4.605 |
| Diethylethanolamine | 0.675 |
| Triethylamine | 1.350 |
| Triethanolamine | 0.172 |
| N-Methylpyrrolidone | 2.866 |
| Silicon Carbide particles (amps* = 20 micrometers) | 9.990 |

TABLE 12-continued

Primer Composition - Example 3

| Ingredients | Weight Percent |
|---|---|
| Carbon Black Pigment | 0.178 |
| Ultramarine Blue Pigment | 0.721 |
| Aluminum Oxide (0.35-0.50 micrometers) | 6.580 |
| Ludox AM Polysilicate | 0.744 |
| Sodium Naphthalenesulfonic Acid | 0.013 |
| Ethoxylated Acetylenic Diols | 0.370 |
| Alkylphenolethoxy Surfactant | 0.152 |
| Coated Mica Flake | 0.200 |
| | 100.000 |

*amps = mean average particle size (blend of P600, P400, and P320)

TABLE 13

Intermediate Layer Composition - Example 3

| Ingredients | Weight Percent |
|---|---|
| PTFE (solids in aqueous dispersion) | 33.980 |
| Water | 37.319 |
| Octylphenolpolyethoxy Surfactant | 4.248 |
| PFA (solids in aqueous dispersion) | 6.132 |
| Stainless Steel Flake 316L Water grade | 1.592 |
| Amorphous Silica | 0.184 |
| PAI-1 | 0.052 |
| Cerium Octoate | 0.590 |
| Oleic Acid | 1.030 |
| Triethanolamine | 4.646 |
| Butylcarbitol | 2.424 |
| Acrylic Resin | 4.880 |
| Hydrocarbon Solvent | 2.889 |
| Sodiumnaphthalenesulfonic Acid | 0.034 |
| | 100.000 |

Example 4—SS flakes in the Intermediate Layer

TABLE 14

Primer Composition - Example 4

| Ingredients | Weight Percent |
|---|---|
| PAI-1 | 4.710 |
| Water | 66.159 |
| PTFE (solids in aqueous dispersion) | 4.310 |
| FEP (solids in aqueous dispersion) | 2.880 |
| Furfuryl Alcohol | 3.469 |
| Diethylethanolamine | 0.665 |
| Triethylamine | 1.329 |
| Triethanolamine | 0.011 |
| N-Methylpyrrolidone | 2.823 |
| Silicon Carbide particles (amps* = 20 micrometers) | 2.571 |
| Carbon Black Pigment | 0.278 |
| Ultramarine Blue Pigment | 1.614 |
| Aluminum Oxide (0.35-0.50 micrometers) | 7.390 |
| Ludox AM Polysilicate | 0.867 |
| Sodium Naphthalenesulfonic Acid | 0.159 |
| Ethoxylated Acetylenic Diols | 0.222 |
| Alkylphenolethoxy Surfactant | 0.522 |
| Hydroxypropyl Cellulose | 0.021 |
| | 100.000 |

*amps = mean average particle size (same blend as in Table 12)

TABLE 15

Intermediate Layer Composition - Example 4

| Ingredients | Weight Percent |
| --- | --- |
| PTFE (solids in aqueous dispersion) | 33.980 |
| Water | 37.319 |
| Octylphenolpolyethoxy Surfactant | 4.248 |
| PFA (solids in aqueous dispersion) | 6.132 |
| Stainless Steel Flake 316L Water grade | 1.592 |
| Amorphous Silica | 0.184 |
| PAI-1 | 0.052 |
| Cerium Octoate | 0.590 |
| Oleic Acid | 1.030 |
| Triethanolamine | 4.646 |
| Butylcarbitol | 2.424 |
| Acrylic Resin | 4.880 |
| Hydrocarbon Solvent | 2.889 |
| Sodiumnaphthalenesulfonic Acid | 0.034 |
| | 100.000 |

Performance Testing—Abrasion, Mar, Ramp up Time to Cooking Temp, and Release

Test pans coated as described in Comparative Examples 1-3 and Examples 1-4 are subjected to AIHAT scratch test, MTP Abrasion Test, SBAR, and Accelerated Cooking Test. The results are shown in Table 16. Superior abrasion resistance of the Examples 1-4 of the invention are indicated by the SBAR tests (both wet and dry) and the MTP test. Good mar and scratch resistance is evidenced by the AIHAT test. Release of the inventions of these examples is as good as conventional prior art cookware. Results of the contact test show that the pans in the examples of this invention heat up to a temperature of 400° F. (204° C.), a typical cooking temperature) in much reduced time. The synergistic effect of SiC particles and stainless steel flake in the undercoat(s) of a coating system used in cookware provides much improved abrasion resistance, faster heat up to cooking temperature and still provides good release.

and SiC in the undercoat. While exhibiting improved ramp up times, Examples 1-4 also exhibit improved abrasion resistance as compared to Comp Examples 1-3. Examples 2-4 is better than Example 1 in this regard, arising from the presence of other inorganic filler film hardener being present in addition to SiC in the undercoat.

Examples 5 and 6—SiC and Nonmagnetizable Flake in the Intermediate Layer

Similar to Examples 1-4, a 3-coat non-stick system representative of the invention is sprayed onto test pans of smooth aluminum that have been treated only by washing to remove grease but not mechanically roughened. The dried coating thicknesses (DFT) for primer/intermediate layer/overcoat are determined from eddy current analysis to be 0.4 mils (10.2 micrometers)/0.7 mils (17.8 micrometers)/0.3 mils (7.6 micrometers).

The primer layer of Example 5 is applied from the same composition as shown in Table 2 (Primer Comparative Example 1) which has no SiC particles in the composition. The primer layer of Example 6 is applied from the same composition as shown in Table 8 (Primer Example 1) which contains SiC particles in the composition. The intermediate layer of Examples 5 and 6 is applied from the composition listed in Table 17 below containing both SiC particles and magnetizable flake in the composition. The overcoat of Examples 5 and 6 is applied from the composition listed in Table 1.

The primer is sprayed onto the aluminum substrate and dried at 150° F. (66° C.) for 5 minutes. The intermediate coat is then sprayed over the dried primer. The overcoat is applied (sprayed) wet on wet to the intermediate coat. The coating is cured by baking at a temperature of 800° F. (427° C.) for 5 minutes.

Pans prepared from Examples 5 and 6 are subjected to tests to determine ramp up time to a temperature of 400° F. Test Results are listed in Table 18. Results of the contact test as described above show that the pans in examples 5 and 6 of this invention heat up to a temperature of 400° F. (204° C.) in

TABLE 16

Performance Properties

| | Comp Ex 1 | Comp Ex 2 | Comp Ex 3 | Ex 1 | Ex 2 | Ex 3 | Ex 4 |
| --- | --- | --- | --- | --- | --- | --- | --- |
| SBAR wet | 183 cycles | 148 cycles | 4350 cycles | 7200 cycles | 14,500 cycles | 11000 cycles | 10,500 cycles |
| SBAR dry | 263 cycles | 338 cycles | 21,750 cycles | 32,000 cycles | 23,500 cycles | 29,000 cycles | 31,000 cycles |
| Ramp up time in seconds to cook temp. 400° F. | 570 | 525 | 510° | 305 | 309 | 375 | 335 |
| MTP | 5 (100 min) | 5 (105 min) | 5 (310 min) | 8 (300 min) | 9 (375 min) | 9 (420 min) | 9 (420 min) |
| | 5 (105 min) | 5 (110 min) | 5 (210 min) | 5 (270 min) | 9 (420 min) | | 9 (420 min) |
| AIHAT (after 10 cycles) | 5 | 5 | 6, 6 | 6, 6 | 7, 8, 8 | 5, 5 | 6, 7 |

These results show the importance of the undercoat containing both magnetizable flakes and SiC particles in reducing ramp up time to reach cooking temperature. Comp. Example 1 does not contain either magnetizable flakes or SiC particles. Comp. Example 2 contains magnetizable flakes, but no SiC, and Comp. Example 3 contains SiC but no magnetizable flakes. Examples 1-4 contain both magnetizable flakes much reduced time. The synergistic effect of SiC particles and stainless steel flake in the intermediate layer of a coating system is shown to exhibit a faster heat up time. When SiC particles are present both in the primer and in the intermediate layer, the intermediate layer also containing stainless steel flakes, ramp up time as shown in Example 6 is even further reduced.

TABLE 17

Intermediate Composition- SiC and SS flakes

| Ingredients | Weight Percent |
|---|---|
| PTFE (solids in aqueous dispersion) | 32.210 |
| Water | 35.717 |
| Octylphenolpolyethoxy Surfactant | 4.248 |
| PFA (solids in aqueous dispersion) | 5.773 |
| P400 Silicon Carbide particles | 3.791 |
| Stainless Steel Flake 316L Water grade | 1.532 |
| Amorphous Silica | 0.184 |
| PAI-1 | 0.052 |
| Cerium Octoate | 0.590 |
| Oleic Acid | 1.030 |
| Triethanolamine | 4.646 |
| Butylcarbitol | 2.424 |
| Acrylic Resin | 4.880 |
| Hydrocarbon Solvent | 2.889 |
| Sodiumnaphthalenesulfonic Acid | 0.034 |
| | 100.000 |

TABLE 18

Ramp up time Examples 5 and 6

| | Comp Ex 1 | Comp Ex 2 | Comp Ex 3 | Ex 5 | Ex 6 |
|---|---|---|---|---|---|
| Ramp up time in seconds to temp 400° F. | 570 | 525 | 510 | 310 | 295 |

What is claimed is:

1. A structure comprising a substrate and a baked release coating on the substrate, the coating comprising an undercoat and a fluoropolymer overcoat, wherein said undercoat contains magnetizable flakes, all said flakes having no induced orientation and a plurality of silicon carbide particles, said undercoat comprising a primer layer and an intermediate layer positioned between said primer and said overcoat, wherein said intermediate layer contains said flakes and said primer layer contains said silicon carbide particles.

2. The structure of claim 1 wherein said magnetizable flakes are stainless steel.

3. The structure of claim 1 wherein said intermediate layer further comprises a fluoropolymer.

4. The structure of claim 1 wherein said primer layer further comprises a fluoropolymer.

5. The structure of claim 1, wherein said intermediate layer also contains silicon carbide particles.

6. The structure of claim 1 or 5 wherein said silicon carbide particles have a mean average particle size in the range of about 3 to about 100 micrometers.

7. The structure of claim 1 or 5 wherein said silicon carbide particles have a mean average particle size in the range of about 5 to about 45 micrometers.

8. The structure of claim 1 wherein said primer layer and/or said intermediate layer further contains inorganic filler film hardener other than said silicon carbide.

9. The structure of claim 8 wherein said inorganic filler film hardener is aluminum oxide.

10. The structure of claim 1 wherein said substrate is aluminum.

11. The structure of claim 1 wherein said substrate is stainless steel.

12. The structure of claim 1 wherein the thickness of said primer layer is 7.5 to 10 micrometers and the thickness of said intermediate layer is 15 to 22 micrometers.

13. The structure of claim 1 wherein the combination of said magnetizable flakes in said intermediate layer and said silicon carbide particles in said primer layer imparts greater heat transfer to said release coating than obtained when only one of said magnetizable flakes and said silicon carbide particles are present.

14. The structure of claim 1 wherein said magnetizable flakes constitute 2 to 10 wt % of said intermediate layer and said silicon carbide particles constitute 2 to 20 wt % of said primer layer.

15. A structure comprising a substrate and a baked release coating on the substrate, the coating comprising an undercoat and a fluoropolymer overcoat, wherein said undercoat contains magnetizable flakes, all said flakes having no induced orientation and a plurality of silicon carbide particles, said undercoat comprising a primer layer and an intermediate layer positioned between said primer and said overcoat, wherein said intermediate layer contains both said flakes and said silicon carbide particles.

* * * * *